No. 781,707. PATENTED FEB. 7, 1905.
J. H. ZIEL.
CHECKREIN HITCHING OR UNHITCHING DEVICE.
APPLICATION FILED JUNE 30, 1904.
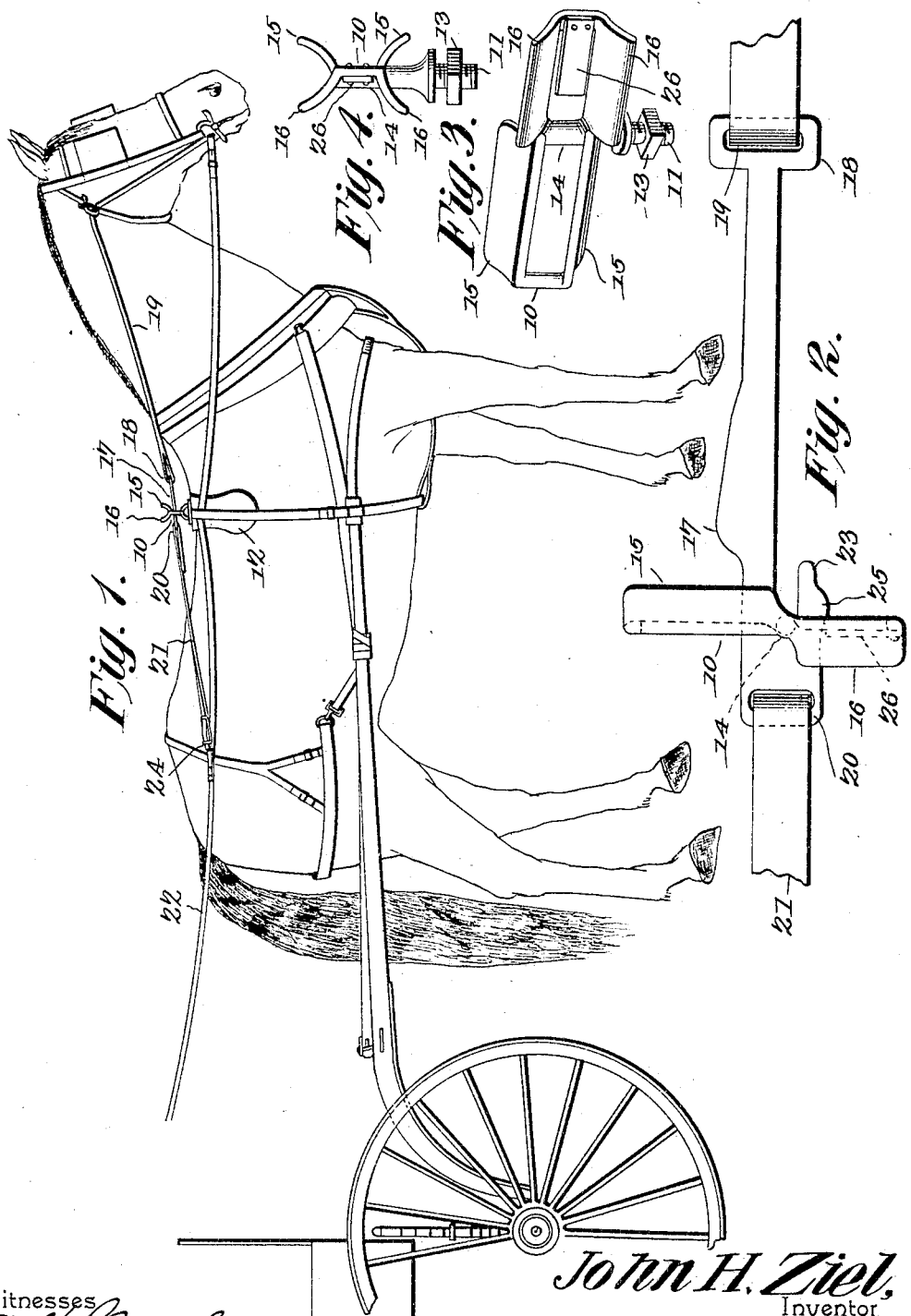
Witnesses
E. H. Stewart
C. N. Woodward
John H. Ziel,
Inventor
by C. A. Snow & Co.
Attorneys No. 781,707.

Patented February 7, 1905.

UNITED STATES PATENT OFFICE.

JOHN HENRY ZIEL, OF GRAND RAPIDS, MICHIGAN.

CHECKREIN HITCHING OR UNHITCHING DEVICE.

SPECIFICATION forming part of Letters Patent No. 781,707, dated February 7, 1905.

Application filed June 30, 1904. Serial No. 214,839.

*To all whom it may concern:*

Be it known that I, JOHN HENRY ZIEL, a citizen of the United States, residing at Grand Rapids, in the county of Kent and State of Michigan, have invented a new and useful Checkrein Hitching or Unhitching Device, of which the following is a specification.

This invention relates to attachments to harness whereby the checkrein may be released and reattached by the driver from his seat and without dismounting, and has for its object to simplify and improve the construction and produce a device of this character which may be readily attached to any harness without change in the structure of the same and by means of which the driver can quickly and readily release and readjust the checkrein by a slight manipulation of the driving-reins.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a view of a horse and a portion of a vehicle with the improved attachment applied. Fig. 2 is a plan view, enlarged, of the improved device detached. Fig. 3 is a perspective view of a portion of the device for attachment to the harness-saddle. Fig. 4 is a side view of the same.

The improved device comprises an open frame 10, preferably rectangular in shape and having means, such as a threaded stud 11, for connection to the saddle portion 12 of a harness, as by a nut 13, the frame being preferably located in the place usually occupied by the ordinary checkrein-hook.

The frame 10 is divided by a transverse member 14 into unequal apertures, with forwardly-extending diverging guide-wings 15 extending forwardly from the larger aperture and similar guide-wings 16 extending rearwardly from the smaller aperture, as shown. A bar 17 is provided for free movement through the larger aperture of the frame, said bar being provided with a loop 18 at one end thereof for connection to the checkrein 19 and a loop 20 at the other end for connection, as by a strap-section 21, to one of the driving-reins, preferably to the right-hand rein 22, as shown, said bar being also provided with an intermediate hook 23 for engagement with the transverse member 14. Any suitable form of buckle or snap, as at 24, may be employed for uniting the link-strap 21 to the rein 22, but will preferably be of a form which can be readily detached and adjusted longitudinally of the rein.

By this simple arrangement it is obvious that a complete, simple, and efficient checkrein-fastening means is provided which will remain in operative position as long as required, but which may be very quickly released by the driver drawing backward upon the rein 22, having the link-strap 21 attached thereto, until the hook 23 is released from the member 14, and then moving the rein and its attached members 21 17 to the left to cause the member 17 and its hook 23 to pass through the larger opening in the frame 10, which it will do when the animal lowers its head. When the checkrein is to be again connected, the rearward pull upon the rein 22 will move the bar 17 rearwardly through the frame and then by moving the rein over to the right the hook 23 will be again engaged with the member 14.

Extending from the outer side of the hook 23 is a lug 25, and attached to the frame 10, at the end having the smaller aperture, is a spring-plate 26, extending by its free end into the path of the lug 25 to present a resilient stop to the movements of the bar, and thereby prevent accidental displacement of the hook.

Thus when the bar 17 is drawn rearwardly to release the checkrein the spring-stop will yield to the pressure, and then when the hook is returned to its former position the pull exerted by the movement of the head of the animal will force the projection on the hook past the yielding stop, as will be obvious.

The device will conform to the other metal parts of the harness and will be a very convenient and valuable attachment to the same and without detracting from the appearance or increasing the expense.

Having thus described the invention, what is claimed is—

1. In a device of the class described, a frame having a transverse aperture provided with oppositely-disposed guiding-wings, a bar movable through said aperture and provided with means for connection respectively to the checkrein and to one of the driving-reins, a hook carried by the bar and adapted to engage the frame, and means for attaching said frame to the harness.

2. In a device of the class described, a frame having an aperture divided by a transverse member and provided with means for attachment to the harness, a bar mounted for movement through said aperture and provided at its ends with means for connection respectively with the checkrein and one of the driving-reins, and a laterally-extending hook carried by the bar and adapted to engage said transverse member.

3. In a device of the class described, a frame having a transverse aperture and provided with means for attachment to the harness, a bar movable through said aperture and having means at its ends for connection respectively to the checkrein and to one of the driving-reins, a hook carried by the bar and adapted to engage said frame, and a spring connected to the frame and extending longitudinally of the aperture for bearing upon said bar to maintain the same yieldably in engagement therewith.

4. In a device of the class described, a frame having a transverse aperture and provided with means for attachment to the harness, a bar movable through said aperture and having means at its opposite ends for connection respectively to the checkrein and to one of the driving-reins, a laterally-extending hook carried by the bar and adapted to engage said frame, a protuberance formed on the bill of the hook and a spring connected to said frame for projection into the path of said protuberance to maintain the hook yieldably in engagement with said frame.

5. In a device of the class described, a frame having an aperture divided by a transverse member and provided with means for attachment to the harness, guide-wings extending in opposite directions from said frame at opposite sides of said transverse member, a bar mounted for movement through said aperture and provided at its ends with means for connection respectively with the checkrein and one of the driving-reins, and a hook carried by the bar and adapted to engage said transverse member.

6. In a device of the class described, a frame provided with a transverse member defining a plurality of apertures, a bar provided with a hook movable through one of said apertures for engagement with the transverse member and having means for connection respectively to the checkrein and to one of the driving-reins, a spring disposed in the second aperture and adapted to engage the bill of the hook, and means for attaching said frame to the harness.

7. As an article of manufacture, a frame provided with a plurality of strap-receiving apertures, and guiding-wings extending in opposite directions from the frame at said apertures.

8. As an article of manufacture, a frame provided with a plurality of horizontally-alined strap-receiving apertures, and guiding-wings extending in opposite directions from said apertures.

9. As an article of manufacture, a frame provided with a plurality of strap-receiving apertures, guiding-wings extending in opposite directions from the apertures, and a spring secured to the frame and disposed at one of said apertures.

In testimony that I claim the foregoing as my own I have hereto affixed my signature in the presence of two witnesses.

JOHN HENRY ZIEL.

Witnesses:
JOHN M. STEKETEE,
FRANK J. ESELTINE.